United States Patent
Nagamine

(10) Patent No.: US 10,211,684 B2
(45) Date of Patent: Feb. 19, 2019

(54) POWER TRANSMITTING APPARATUS, CONTROL METHOD, AND STORAGE MEDIUM

(71) Applicant: CANON KABUSHIKI KAISHA, Tokyo (JP)

(72) Inventor: Kazuhide Nagamine, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 417 days.

(21) Appl. No.: 14/733,134

(22) Filed: Jun. 8, 2015

(65) Prior Publication Data
US 2015/0364926 A1    Dec. 17, 2015

(30) Foreign Application Priority Data
Jun. 12, 2014 (JP) ................. 2014-121843

(51) Int. Cl.
| | |
|---|---|
| H01F 27/42 | (2006.01) |
| H01F 37/00 | (2006.01) |
| H01F 38/00 | (2006.01) |
| H02J 50/80 | (2016.01) |
| H04B 5/00 | (2006.01) |
| H02J 7/02 | (2016.01) |
| H02J 50/40 | (2016.01) |
| H02J 50/00 | (2016.01) |
| H02J 50/10 | (2016.01) |

(52) U.S. Cl.
CPC .............. *H02J 50/80* (2016.02); *H02J 7/025* (2013.01); *H02J 50/00* (2016.02); *H02J 50/40* (2016.02); *H04B 5/0037* (2013.01); *H02J 50/10* (2016.02)

(58) Field of Classification Search
CPC .. H02J 7/025; H02J 5/005; H02J 50/80; H02J 50/00; H02J 50/40; H02J 50/10; H04B 5/0037
USPC .......................................... 307/104
See application file for complete search history.

(56) References Cited

U.S. PATENT DOCUMENTS

| | | | |
|---|---|---|---|
| 2013/0079937 A1* | 3/2013 | Aisu | H02J 13/0086 700/286 |
| 2013/0181665 A1* | 7/2013 | Lee | H02J 7/007 320/108 |
| 2013/0328417 A1* | 12/2013 | Takeuchi | H02J 5/005 307/149 |

(Continued)

FOREIGN PATENT DOCUMENTS

| | | |
|---|---|---|
| JP | 2006-197734 A | 7/2006 |
| JP | 2006-340541 A | 12/2006 |

(Continued)

OTHER PUBLICATIONS

Japanese Office Action dated Mar. 16, 2018 in corresponding Japanese Patent Application No. 2014121843 with English translation, 7 pages.

*Primary Examiner* — Carlos Amaya
(74) *Attorney, Agent, or Firm* — Carter, DeLuca, Farrell & Schmidt, LLP

(57) ABSTRACT

A power transmitting apparatus, which has a capability of wirelessly transmitting power to a power receiving apparatus, obtains time information indicating a time for starting of the power transmission to the power receiving apparatus and controls a timing of power transmission based on the time information.

16 Claims, 8 Drawing Sheets

(56) References Cited

U.S. PATENT DOCUMENTS

| | | | |
|---|---|---|---|
| 2014/0346888 A1* | 11/2014 | Kim | H02J 7/025 |
| | | | 307/104 |
| 2015/0061398 A1* | 3/2015 | Kudo | H04B 5/0031 |
| | | | 307/104 |
| 2015/0303730 A1* | 10/2015 | Hoda | H02J 50/80 |
| | | | 320/108 |
| 2015/0364946 A1* | 12/2015 | Wang | H02J 7/04 |
| | | | 455/573 |

FOREIGN PATENT DOCUMENTS

| | | |
|---|---|---|
| JP | 2009-251895 A | 10/2009 |
| JP | 2010-187452 A | 8/2010 |
| JP | 2014-017925 A | 1/2014 |
| WO | 2012/140826 A1 | 10/2012 |

\* cited by examiner

FIG. 3

| NOVEMBER 11 | NOVEMBER 12 | NOVEMBER 15 | NOVEMBER 18 |
|---|---|---|---|
| 23 : 00 ~ 24 : 00 VIEWING | 11 : 00 ~ 13 : 00 VIEWING | 8 : 00 ~ 9 : 00 VIEWING | 11 : 00 ~ 13 : 00 VIEWING |
| | 15 : 00 ~ 17 : 00 VIEWING | 18 : 00 ~ 19 : 00 VIEWING | 15 : 00 ~ 17 : 00 VIEWING |
| | 19 : 00 ~ 20 : 00 VIEWING | | 19 : 00 ~ 20 : 00 VIEWING |
| | 22 : 00 ~ 24 : 00 VIEWING | | |

FIG. 4

| NOVEMBER 11 | NOVEMBER 12 | NOVEMBER 15 | NOVEMBER 18 |
|---|---|---|---|
| 23 : 00 ~ 24 : 00 200W | 11 : 00 ~ 13 : 00 200W | 8 : 00 ~ 9 : 00 200W | 11 : 00 ~ 13 : 00 200W |
| | 15 : 00 ~ 17 : 00 200W | 18 : 00 ~ 19 : 00 200W | 15 : 00 ~ 17 : 00 200W |
| | 19 : 00 ~ 20 : 00 200W | | 19 : 00 ~ 20 : 00 200W |
| | 22 : 00 ~ 24 : 00 200W | | |

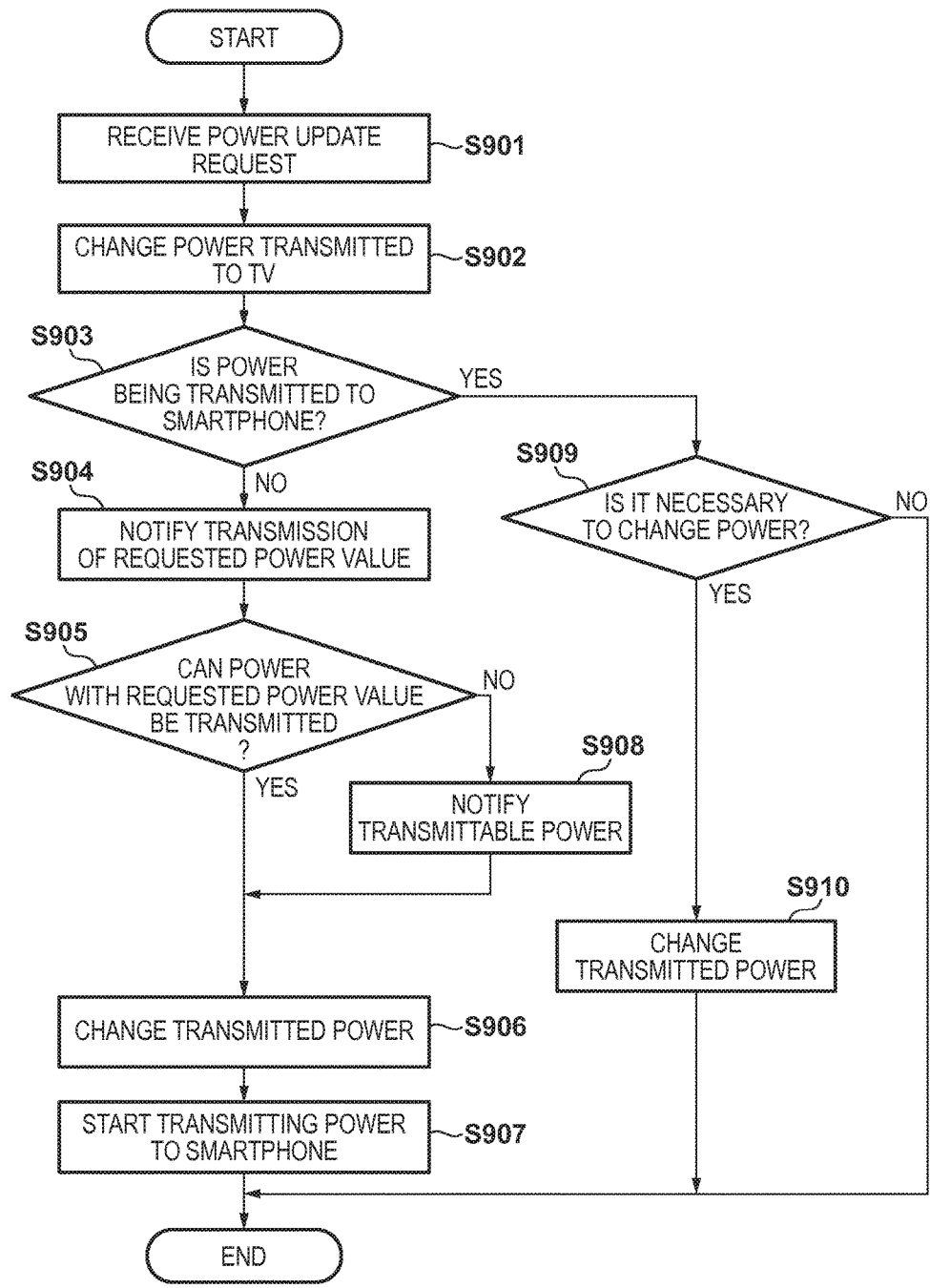

POWER TRANSMITTING APPARATUS, CONTROL METHOD, AND STORAGE MEDIUM

BACKGROUND OF THE INVENTION

Field of the Invention

The present invention relates to a wireless power transfer technique.

Description of the Related Art

Recently, there have been available a wireless power transfer technique of wirelessly transferring power and a contactless charging technique. Studies have been made to make a power transmitting apparatus on the power transmission side perform power transmission control in accordance with the state of a power receiving apparatus on the power reception side when performing wireless power transfer (Japanese Patent Laid-Open Nos. 2006-197734 and 2006-340541). Japanese Patent Laid-Open No. 2006-197734 discloses that an apparatus, which transmits power while transmitting data, monitors data to be transmitted and increases the amount of power to be transmitted, for example, in the intervals between songs. In addition, Japanese Patent Laid-Open No. 2006-340541 discloses that a power feeding apparatus on the road side receives vehicle information about a vehicle as a power receiving apparatus and controls transmitted power based on the vehicle information.

However, the techniques disclosed in Japanese Patent Laid-Open Nos. 2006-197734 and 2006-340541 do not consider anything about power demand in the power receiving apparatus, and hence cannot transmit power in synchronization with a change in power demand in the power receiving apparatus.

SUMMARY OF THE INVENTION

According to one aspect of the present invention, there is provided a power transmitting apparatus comprising: a power transmitting unit configured to wirelessly transmit power to a power receiving apparatus; an obtaining unit configured to obtain time information indicating a time for starting of the power transmission to the power receiving apparatus; and a control unit configured to control a timing of power transmission by the power transmitting unit based on the time information.

Further features of the present invention will become apparent from the following description of exemplary embodiments (with reference to the attached drawings).

BRIEF DESCRIPTION OF THE DRAWINGS

FIG. 3 is a view showing the first example of a time table concerning the demand of power transmission;

FIG. 4 is a view showing the second example of a time table concerning the demand of power transmission;

FIG. 9 is a flowchart showing an example of the third processing procedure executed by the power transmitting apparatus 101.

DESCRIPTION OF THE EMBODIMENTS

An embodiment of the present invention will be described in detail below with reference to the accompanying drawings.

(System Configuration)

Figure 1:
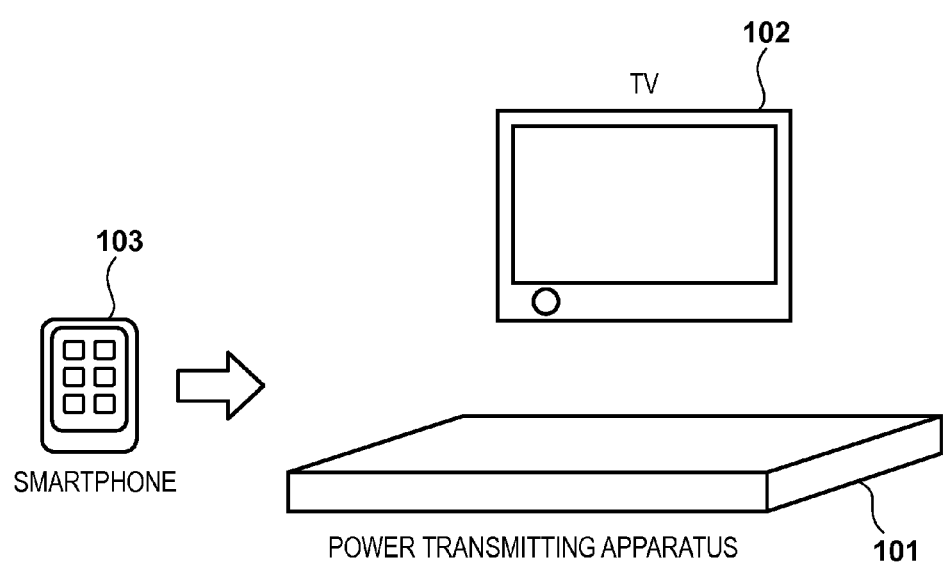
FIG. 1 is a conceptual diagram of a wireless power transfer system.

FIG. 1 is a conceptual diagram of a wireless power transfer system according to this embodiment. As shown in FIG. 1, the wireless power transfer system includes a power transmitting apparatus 101 and a TV (television) 102 as a power receiving apparatus. In some cases, a power receiving apparatus includes a smartphone 103. In this case, the TV 102 operates while receiving power transmitted by the power transmitting apparatus 101 by wireless power transfer, whereas the smartphone 103 performs contactless charging while receiving power transmitted by the power transmitting apparatus 101 by wireless power transfer. If there are a plurality of power receiving apparatuses, the power transmitting apparatus 101 can perform wireless power transfer while individually changing the amount of power to be transmitted. Note that the power transmitting apparatus 101 controls the amount of power to be transmitted to each power receiving apparatus within the maximum power value range in which the power transmitting apparatus 101 can transmit power by itself.

(Apparatus Arrangement)

Figure 2:
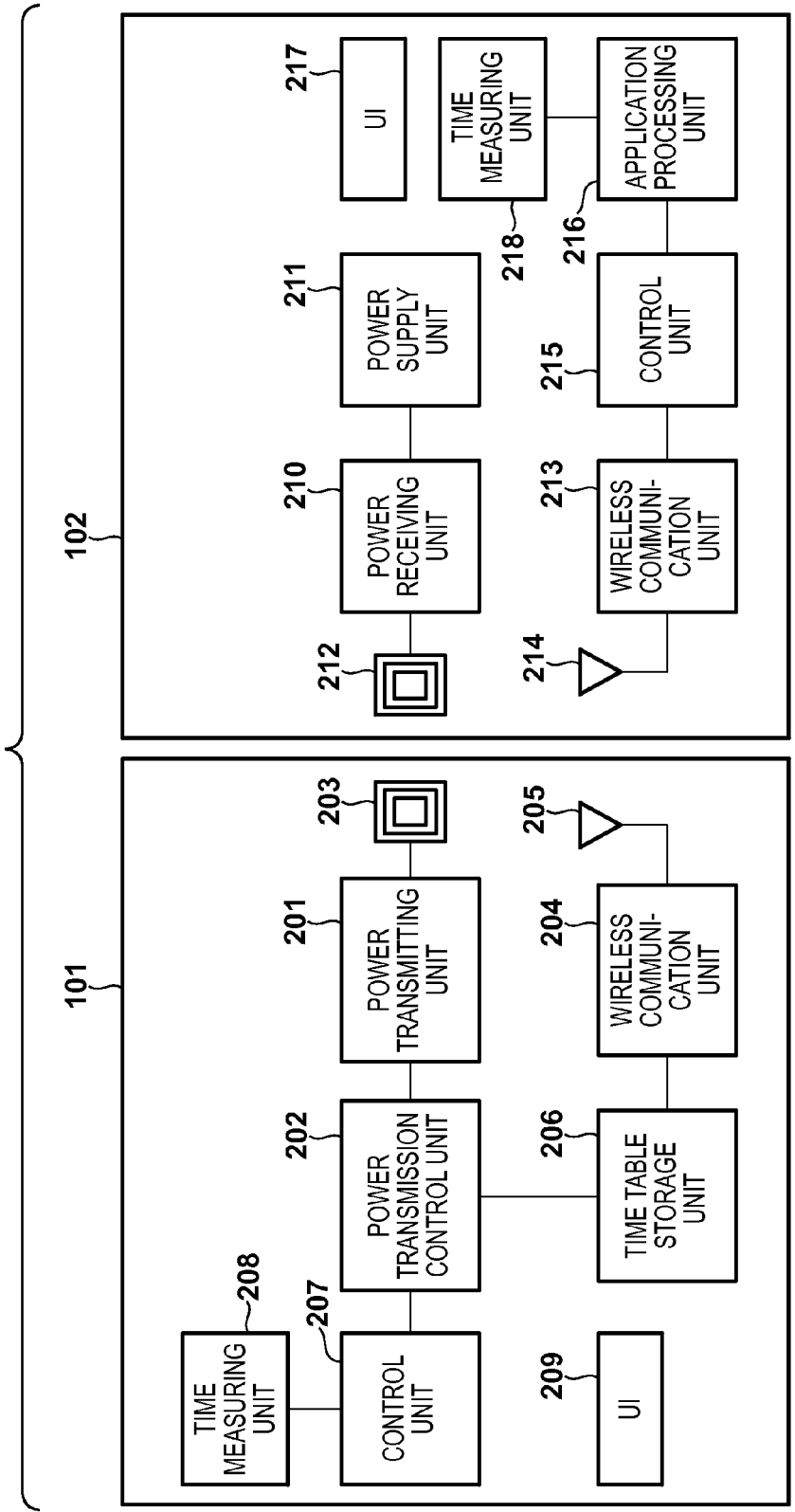
FIG. 2 is a block diagram showing examples of the functional arrangements of a power transmitting apparatus 101 and TV 102.

FIG. 2 shows an example of the functional arrangements of the power transmitting apparatus 101 and TV 102. Referring to FIG. 2, the power transmitting apparatus 101 includes a power transmitting unit 201, a power transmission control unit 202, a power transmission antenna 203, a wireless communication unit 204, a wireless communication antenna 205, a time table storage unit 206, a control unit 207, a time measuring unit 208, and a UI (user interface) unit 209. The TV 102 includes a power receiving unit 210, a power supply unit 211, a power receiving antenna 212, a wireless communication unit 213, a wireless communication antenna 214, a control unit 215, an application processing unit 216, a UI (user interface) unit 217, and a time measuring unit 218.

In the power transmitting apparatus 101, the power transmitting unit 201 performs processing concerning power transmission such as forming a wireless signal for power transmission and transmits power to a power receiving apparatus via the power transmission antenna 203 under the control of the power transmission control unit 202. The power transmission control unit 202 changes the amount of power to be transmitted by controlling the power transmitting unit 201 in accordance with, for example, at least one of a prediction of a change in power demand in a power receiving apparatus, stored in the time table storage unit 206, and an instruction from the control unit 207. For example, with regard to a temporal change in demand, the power transmission control unit 202 sets the amount of power to be transmitted by the power transmitting unit 201 before an actual change in powder demand in synchronization with the temporal change in demand, and then executes power transmission. In this manner, the power transmission control unit 202 obtains information about power demand in advance and changes the amount of power to be transmitted based on the information. This can eliminate the time lag required to detect/determine a temporal change in demand.

The wireless communication unit 204 requests, for example, the power receiving apparatus (TV 102) for information about power demand via the wireless communication antenna 205, and receives the information as a response to the request. Note that the power transmitting apparatus 101 need not request for such information, and the power receiving apparatus may notify the power transmitting apparatus of information about demand when requesting for power transmission. In addition, the wireless communication unit 204 may receive a request for power transmission from the power receiving apparatus and notify the power receiving apparatus of various information such as whether power can be transmitted. Note that the wireless communication unit 204 may perform communication other than communication concerning wireless power transfer.

The time table storage unit 206 stores time table information as information about a temporal change in power demand, which is transmitted by the power receiving apparatus and received by the wireless communication unit 204. Time table information may indicate power requested by the power receiving apparatus at each time or may be information indicating a specific operation mode in which the power receiving apparatus operates at each time. Note that when using information indicating a specific operation mode in which the power receiving apparatus operates at each time as time table information, the power transmitting apparatus 101 stores the correspondence relationship between the operation modes and power demands. The power transmitting apparatus 101 can obtain information about a temporal change in power demand with a temporal change in operation mode by referring to the stored information.

FIG. 3 shows an example of a time table as information indicating a specific operation mode in which the TV 102 operates at each time. As shown in FIG. 3, this time table shows viewing reservation information at each time. In this table, the operation modes of the TV 102 include two modes, namely "viewing" and "not viewing". In this case, as shown in FIG. 3, the time table may not contain information other than the "viewing" state. In this case, the power transmitting apparatus 101 can determine that "viewing" is not performed at other times. Note that in this embodiment and the scope of the following claims, since dates are part of times, dates and times will be collectively referred to as "times".

Upon receiving a time table like that shown in FIG. 3, the power transmitting apparatus 101 stores the received information in the time table storage unit 206. On the other hand, the power transmitting apparatus 101 stores, for example, information indicating that there is a demand for the transmission of a power of 200 W while the operation mode is "viewing". This allows the power transmitting apparatus 101 to recognize by using the time table in FIG. 3 that the TV 102 will request for the transmission of a power of 200 W during the time interval between 23:00 and 24:00 on December 11 and to change the amount of power to be transmitted. In this manner, the power transmitting apparatus 101 can change the amount of power to be transmitted in synchronization with a temporal change in the demanded amount of power to be transmitted for each operation mode of the power receiving apparatus (for example, the TV 102). Assume that the TV 102 has a recording function and requires the transmission of a power of 100 W for the function. In this case, when the operation mode is "recording", the power transmitting apparatus 101 stores information indicating that there is a demand for the transmission of a power of 100 W. In this case, the time table in FIG. 3 can contain, for example, the operation mode "recording" other than "viewing".

FIG. 4 shows an example of a time table indicating how much the TV 102 requests for at each time. In this case, the TV 102 specifies the amount of power to be transmitted to be requested at each time in accordance with the operation mode in which it operates, generates a table indicating the correspondence relationship between the specified amount of power to be transmitted and the respective times, and transmits the table to the power transmitting apparatus 101. Upon receiving a time table like that shown in FIG. 4, the power transmitting apparatus 101 stores the information in the time table storage unit 206. In this case, the power transmitting apparatus 101 need not store information about power demand corresponding to each operation mode. This is because the received time table contains the exact power values to be requested. This allows the power transmitting apparatus 101 to recognize that, for example, the TV 102 will request for the transmission of a power of 200 W in the time interval between 23:00 to 24:00 on December 11, by using the time table in FIG. 4, and to change the amount of power to be transmitted. In this manner, the power transmitting apparatus 101 can change the amount of power to be transmitted in synchronization with a temporal change in the demanded amount of power transmission for each operation mode of the power receiving apparatus (for example, the TV 102).

Referring back to FIG. 2, the control unit 207 controls the power transmitting apparatus 101, and the time measuring unit 208 obtains date/time information and notifies the control unit 207 that a preset date/time has been reached. The UI unit 209 is constituted by a display unit and an operation unit, and presents information to the user or accepts an operation from the user.

In the power receiving apparatus (TV 102), the power receiving unit 210 receives the power wirelessly transmitted by the power transmitting apparatus 101 via the power receiving antenna 212. The power supply unit 211 supplies the power received by the power receiving unit 210 to the TV 102 upon converting the power into a voltage required for the TV 102. The wireless communication unit 213 wirelessly communicates with another apparatus via the wireless communication antenna 214. For example, the wireless communication unit 213 requests the power transmitting apparatus 101 for the transmission of power by wireless power transfer and receives a response to the request via the wireless communication antenna 214. In addition, the wireless communication unit 213 transmits a time table associated with a temporal change in power demand, such as viewing reservations in the TV 102, to the power transmitting apparatus 101. The wireless communication unit 213 also executes various types of communication associated with wireless power transfer with the power transmitting apparatus 101. In some case, the wireless communication unit 213 further executes communication other than communication associated with wireless power transfer with the power transmitting apparatus 101 or another communication apparatus.

The control unit 215 controls the TV 102, and the application processing unit 216 performs a series of processing such as all the processing based on the TV functions and viewing reservation processing by registering operations by the user. The UI unit 217 is constituted by a display unit and an operation unit, and presents information to the user or accepts an operation from the user. The time measuring unit 218 has a time measuring function for obtaining date/time information, and notifies the application processing unit 216 that a preset date/time has been reached.

Although FIG. 2 omits the illustration of some functions such as a display on which the TV 102 displays a TV image, the power transmitting apparatus 101 and the TV 102 may have functions other than those shown in FIG. 2. For example, the TV 102 has general functions as a TV.

(Processing Procedure)

The next will describe a processing procedure in which the TV 102 generates and transmits a time table associated with demands for power transmission and the first processing procedure executed by the power transmitting apparatus 101 based on the received time table. Assume that in the following description, a time table indicating demands for power transmission in the TV 102 has already been transmitted to the power transmitting apparatus 101. That is, assume that when the following processing is performed, both the TV 102 and the power transmitting apparatus 101 have already held the time table associated with power demand in the TV 102. Note that an empty time table may be stored initially, or a time table may be newly generated at the timing of "update" to be described below, when no time table is held.

(Processing in TV 102)

Figure 5:
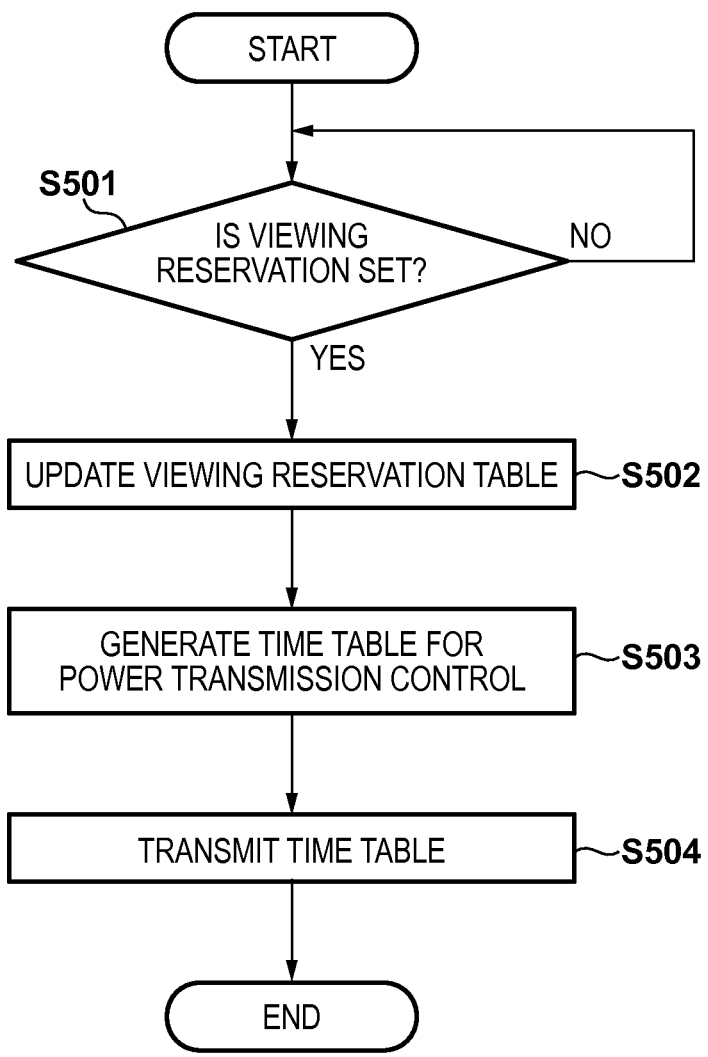
FIG. 5 is a flowchart showing an example of a processing procedure executed by the TV 102.

FIG. 5 shows an example of a processing procedure to be performed when a viewing reservation is made in the TV 102. First of all, the TV 102 determines whether a viewing reservation has been made by, for example, the operation of the user via the UI unit 217 or a recommendation function executed by the application processing unit 216 in the TV 102 (step S501). If the TV 102 determines that a viewing reservation has been made (YES in step S501), the application processing unit 216 updates the viewing reservation table stored in, for example, the application processing unit 216 itself (step S502). If the TV 102 determines that no viewing reservation has been made (NO in step S501), the TV 102 continues observing whether a viewing reservation is made. Note that this observation may be performed at predetermined time intervals, such as every 30 min or 1 hr.

The application processing unit 216 transfers the updated table information to the control unit 215. The control unit 215 generates a power transmission control time table to be transmitted to the power transmitting apparatus 101 based on the transferred table information (step S503). Note that this power transmission control time table may be one that indicates the operation mode of the TV 102 at each time like that shown in FIG. 3 or one that indicates a requested power value in the TV 102 at each time like that shown in FIG. 4. The control unit 215 transfers the generated table to the wireless communication unit 213. The wireless communication unit 213 transmits the data of the power transmission control time table to the power transmitting apparatus 101 via the wireless communication antenna 214 (step S504).

(First Processing in Power Transmitting Apparatus 101)

Figure 6:
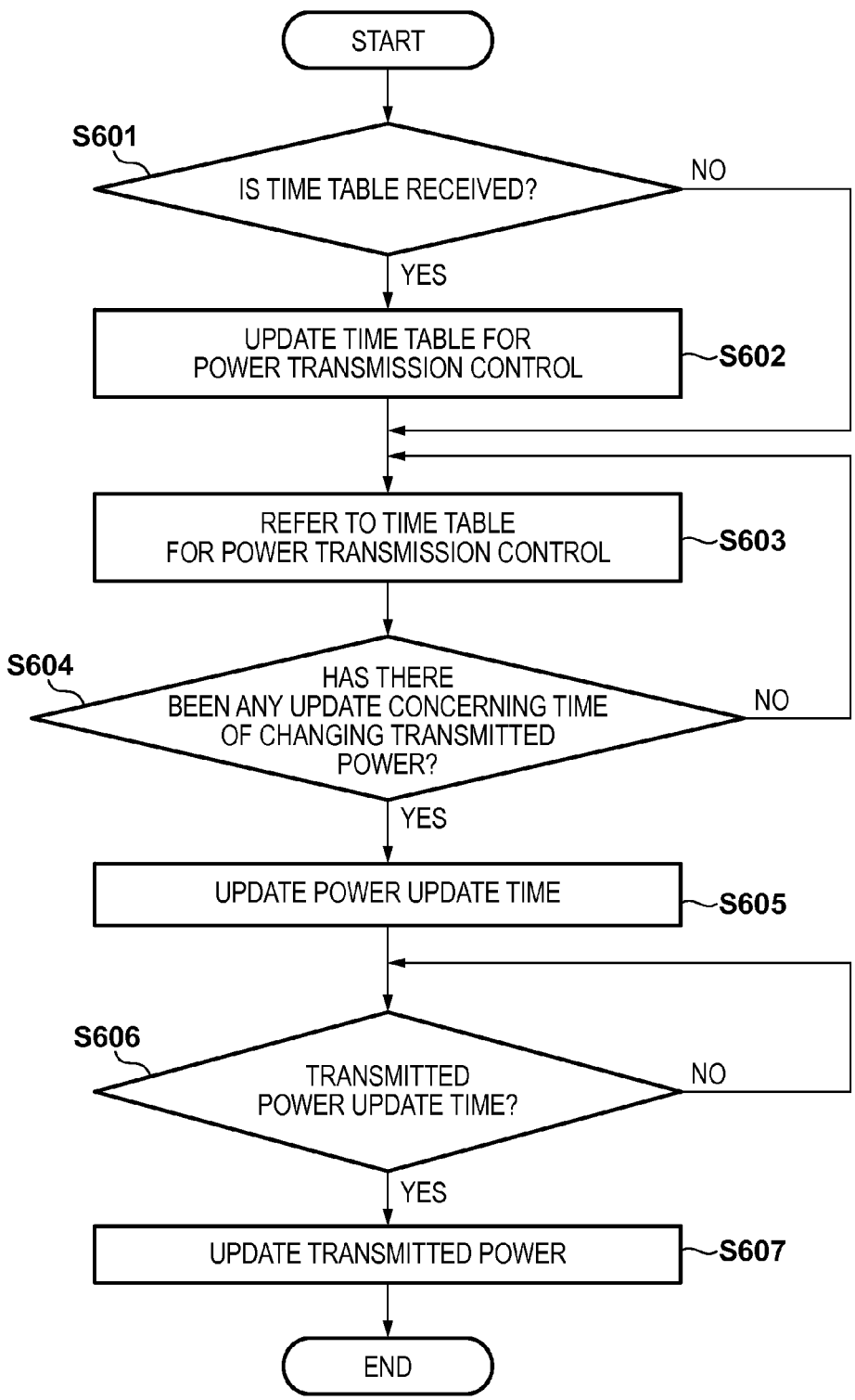
FIG. 6 is a flowchart showing an example of the first processing procedure executed by the power transmitting apparatus 101.

FIG. 6 shows an example of the first processing procedure executed by the power transmitting apparatus 101. First of all, the power transmitting apparatus 101 determines whether it has received a power transmission control time table from the power receiving apparatus (TV 102) via the wireless communication antenna 205 and the wireless communication unit 204 (step S601). If the power transmitting apparatus 101 determines that it has received the power transmission control time table (YES in step S601), the power transmitting apparatus 101 updates the information of the power transmission control time table stored in the time table storage unit 206 (step S602). Note that if the power transmitting apparatus 101 has received no power transmission control time table (NO in step S601), the process advances to step S603.

The power transmission control unit 202 periodically refers to the time table stored in the time table storage unit 206 (step S603). The power transmission control unit 202 then determines, from the referred time table, whether there has been any update concerning the time of changing the transmitted power (S604). If any update has been made (YES in step S604), the power transmission control unit 202 notifies the control unit 207 of the updated information (step S605). In addition, the control unit 207 notifies the time measuring unit 208 of the notified updated time (step S605). With the processing in step S605, the update concerning the time of changing the transmitted power is complete inside the power transmitting apparatus 101. In contrast, if the power transmission control unit 202 determines that there has been no update (NO in step S604), the process returns to step S603 to continue periodic reference to the time table.

Subsequently, the time measuring unit 208 determines whether the current time has reached the time of changing the transmitted power (step S606). In this determination, the time measuring unit 208 may determine whether the current time has reached a time preceding a time of a change in power demand in the power receiving apparatus by a predetermined time corresponding to the processing time taken to change the transmitted power. In addition, the time to be notified may indicate a time preceding a time of a change in power demand in the power receiving apparatus by the above predetermined time. In any case, upon determining that the current time has reached the time of changing the transmitted power (YES in step S606), the time measuring unit 208 notifies the control unit 207 that the time of changing the transmitted power has been reached. Upon receiving this notification, the control unit 207 notifies the power transmission control unit 202 to make it change the transmitted power. The power transmission control unit 202 then decides power to be transmitted by referring to the time table stored in the time table storage unit 206, and controls the power transmitting unit 201 to change the transmitted power (step S607). In contrast to this, upon determining that the current time has not reached the time of changing the transmitted power (NO in step S606), the time measuring unit 208 continues observing whether the current time has reached the time of changing the transmitted power.

With the above processing, the power transmitting apparatus 101 can obtain information about demands for power transmission in the TV 102 and change the transmitted power in synchronization with a temporal change in power demand.

(Second Processing in Power Transmitting Apparatus 101)

The following will describe the second processing to be executed by the power transmitting apparatus 101 when a power receiving apparatus (smartphone 103) other than the TV 102 exists in the power transmittable area in which the power transmitting apparatus 101 can perform power transmission while the power transmitting apparatus 101 is transmitting power to the TV 102.

Figure 7:
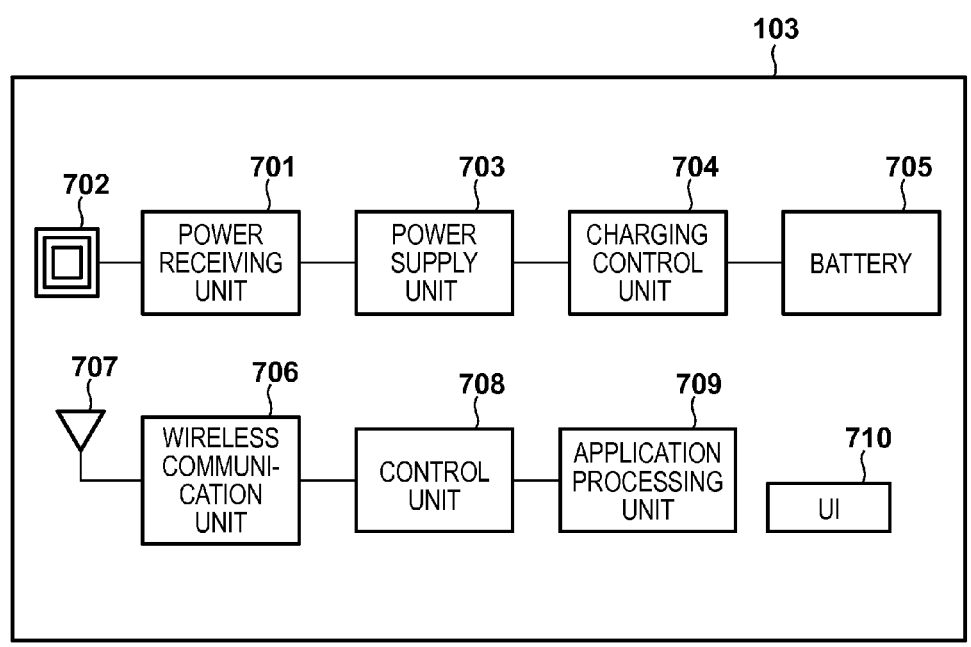
FIG. 7 is a block diagram showing an example of the functional arrangement of a smartphone 103.

In this case, as shown in, for example, FIG. 7, the smartphone 103 includes, as units having the same functions as those of the TV 102, a power receiving unit 701, a power receiving antenna 702, a wireless communication unit 706, a wireless communication antenna 707, a control unit 708, an application processing unit 709, and a UI unit 710. Note that the smartphone 103 further includes a power supply unit 703, a charging control unit 704, and a battery 705. The power supply unit 703 supplies the power received by the power receiving unit 701 as battery charging power, and the charging control unit 704 charges the battery 705 and performs charging control.

Figure 8:
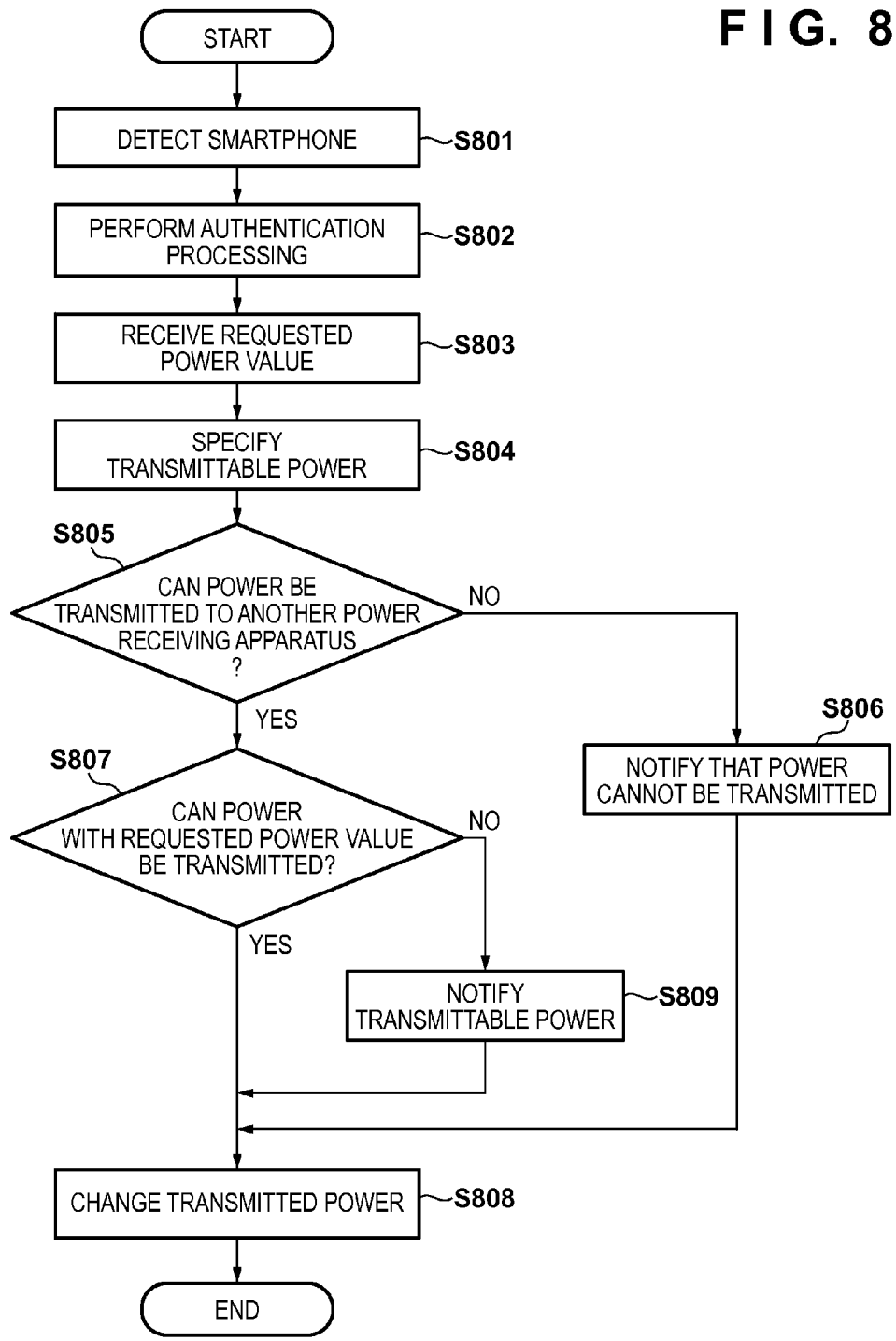
FIG. 8 is a flowchart showing an example of the second processing procedure executed by the power transmitting apparatus 101.

FIG. 8 shows an example of the second processing procedure executed by the power transmitting apparatus 101.

If the smartphone 103 exists in the power transmittable area while the power transmitting apparatus 101 is transmitting power required for TV viewing to the TV 102, the power transmitting apparatus 101 detects the presence of the smartphone 103 (step S801). Upon detecting the smartphone 103, the power transmitting apparatus 101 performs authentication processing by wireless communication to check whether the smartphone 103 is a target to which power should be wirelessly supplied (step S802). Note that upon determining by authentication processing that the smartphone 103 is a target power receiving apparatus to which power should be supplied, the power transmitting apparatus 101 notifies, by wireless communication, the smartphone 103 that, for example, the authentication processing is finished. With this processing, the authentication of the smartphone 103 by the power transmitting apparatus 101 is complete.

Note that before, after, or during this authentication processing, the control unit 708 of the smartphone 103 calculates power to be received which is required for charging by checking the remaining amount of the battery 705, and outputs an instruction to the wireless communication unit 706 to transmit a requested power value to be transmitted. The wireless communication unit 706 then transmits the requested power value to the power transmitting apparatus 101 via the wireless communication antenna 707.

The power transmitting apparatus 101 receives the requested power value from the smartphone 103 (step S803), and newly specifies a power value which can be transmitted to the smartphone 103, based on the maximum transmittable power value of the power transmitting apparatus 101 itself and the currently transmitted power value (step S804). Note that the power value which can be transmitted to the smartphone 103 is calculated by, for example, subtracting the currently transmitted power value from the maximum transmittable power value. Note that power values which can be transmitted may be calculated upon determining a priority order among apparatuses. For example, the priority level of the transmission of power for charging of the smartphone 103 is compared with that of the transmission of power for program viewing in the TV 102, and power values which can be transmitted are then calculated based on the comparison result. In addition, it is possible to set a lower priority level for an apparatus driven by a battery and a higher priority level for an apparatus mainly driven by transmitted power.

Subsequently, the power transmitting apparatus 101 determines, based on the calculated power which can be transmitted, whether power can be transmitted to the smartphone 103 (step S805). If, for example, the power value which can be transmitted is equal to or less than a predetermined value, the power transmitting apparatus 101 determines that the power cannot be transmitted to the smartphone 103. In this case, the predetermined value is, for example, 0 or a minimal positive number. Note that in the determination in step S805, it is possible to determine that power cannot be transmitted, for example, in a case in which the smartphone 103 has continuously requested power transmission for a predetermined period of time, and it is known that power demand by another power receiving apparatus will increase before the expiration of the period.

Upon determining that power cannot be transmitted to the smartphone 103 (NO in step S805), the power transmitting apparatus 101 notifies the smartphone 103 that power cannot be currently transmitted (step S806). Upon receiving this notification, the smartphone 103 displays, for example, on the UI unit 710, information indicating that contactless charging cannot be performed, to notify the user that power cannot be received.

Note that when performing determination in step S805, the power transmitting apparatus 101 can check the estimated viewing end time of a currently viewed program by referring to the time table stored in the time table storage unit 206, if a viewing reservation has been made for the currently viewed program. In this case, if it is possible to transmit power to the smartphone 103 by reducing the power transmitted to the TV 102 after the end of viewing, the power transmitting apparatus 101 may notify the smartphone 103 of the estimated viewing end time, that is, the time when the amount of power to be transmitted which is requested by the TV 102 will decrease. This allows the smartphone 103 to display, on, for example, the UI unit 710, the notified time as the estimated contactless charging start time. In addition, the smartphone 103 can calculate the estimated charging complete time from the estimated start time and the current remaining amount of battery, and display the calculated time on the UI unit 710. In addition, the power transmitting apparatus 101 may check a viewing reservation in the TV 102, and notify the smartphone 103 of information indicating the time when the amount of power to be transmitted which is requested by the TV 102 will increase. With this operation, when, for example, power transmission from the power transmitting apparatus 101 to the smartphone 103 will be interrupted before the battery is fully charged, the smartphone 103 can notify the user via the UI unit 710 of the time when the power transmission will be interrupted. Notifying, in this manner, the smartphone 103 of the time when the amount of power to be transmitted which is requested by the TV 102 changes makes it possible for the user to place the smartphone 103 in the power transmittable area of the power transmitting apparatus 101 upon selecting the time when charging can be efficiently performed.

Upon detecting that power can be transmitted to the smartphone 103 (YES in step S805), the power transmitting apparatus 101 then determines whether the power requested from the smartphone 103 can be transmitted (step S807). This determination is performed by determining whether the value obtained by subtracting the power value currently transmitted to another power receiving apparatus such as the TV 102 from the maximum power value which can be transmitted by the power transmitting apparatus 101 is equal to or more than the power value requested from the smartphone 103. If, for example, the value obtained by subtracting the power value currently transmitted to another power receiving apparatus from the maximum transmittable power value of the power transmitting apparatus 101 is equal to or more than the power value requested from the smartphone 103, the power transmitting apparatus 101 determines that the requested power can be transmitted to the smartphone 103. Note that in this case, the above priority order may also be used. In this case, if, for example, there is any power receiving apparatus at the power transmission destination which is higher in priority than charging of the smartphone 103, the power transmitting apparatus 101 performs the above determination by using the sum total of powers transmitted as the power value currently transmitted to another power receiving apparatus. That is, in this case, power currently transmitted to an apparatus lower in priority than charging of the smartphone 103 need not be considered as the power value currently transmitted to another power receiving apparatus. This increases the probability of determining that requested power can be transmitted to a power transmission destination with a high priority level.

Upon determining that the power requested from the smartphone 103 can be transmitted (YES in step S807), the power transmitting apparatus 101 controls the power transmitting unit 201 so as to set the power transmitted to the smartphone 103 to the requested power value, thereby changing the transmitted power value (step S808). The power transmitting apparatus 101 then executes power transmission to both the TV 102 and the smartphone 103.

On the other hand, upon determining that the power requested from the smartphone 103 cannot be transmitted (NO in step S807), the power transmitting apparatus 101 notifies the smartphone 103 that power with a transmittable power value is transmitted to the smartphone 103 (step S809). In this case, the transmittable power value is, for example, the value obtained by subtracting the power value currently transmitted to another power receiving apparatus from the maximum transmittable power value of the power transmitting apparatus 101. That is, if the value obtained by subtracting the power value currently transmitted to another power receiving apparatus from the transmitted power value of the power transmitting apparatus 101 is smaller than the power value requested from the smartphone 103, the power transmitting apparatus 101 specifies the subtraction result as the transmittable power value to the smartphone 103. Note that in this case, the above priority order may also be used. In this case, the power transmitting apparatus 101 specifies a transmittable power value to the smartphone 103 without considering the power currently transmitted to an apparatus lower in priority than charging of the smartphone 103 as the power value currently transmitted to another power receiving apparatus. This makes it possible to ensure a large power transmitted to a power transmission destination with a higher priority level.

Upon receiving a notification of power which can be transmitted, the smartphone 103 displays, on the UI unit 710, information indicating that a charging time longer than the normal time is required. In addition, the smartphone 103 may calculate an estimated charging complete time from the actually received power value and the current remaining amount of the battery and display the estimated charging complete time.

Upon notifying the power which can be transmitted, the power transmitting apparatus 101 controls the power transmitting unit 201 so as to transmit the power which can be transmitted to the smartphone 103, thereby changing the transmitted power value (step S808). The power transmitting apparatus 101 then executes power transmission to both the TV 102 and the smartphone 103.

In this manner, with the second processing, even if another power receiving apparatus (smartphone 103) exists in the power transmittable range of the power transmitting apparatus 101 while transmitting power to the TV 102, it is possible to distribute transmitted power in synchronization with the power demand in the TV 102. Note that it is possible to properly distribute transmitted power to a plurality of power receiving apparatuses in accordance with the respective power demands by, for example, giving higher priority to a power receiving apparatus which is currently receiving power or comparing the priority levels of the operation modes of the respective power receiving apparatuses.

(Third Processing in Power Transmitting Apparatus 101)

The following will describe the third processing to be executed by the power transmitting apparatus 101 when power is currently transmitted to the TV 102 during viewing and the smartphone 103 or the smartphone 103 is on standby for the start of charging by power transmission from the power transmitting apparatus 101. FIG. 9 shows an example of the third processing procedure executed by the power transmitting apparatus 101.

Assume that the viewing of a program on the TV 102 is complete while the power transmitting apparatus 101 is transmitting power to the TV 102 and the smartphone 103 or the smartphone 103 is on standby for the start of charging by power transmission from the power transmitting apparatus 101. In this case, when only standby power is required, the TV 102 notifies the power transmitting apparatus 101 of a received power change request, and the power transmitting apparatus 101 receives the power change request (step S901). Upon receiving this notification, the power transmitting apparatus 101 changes the transmitted power value from the power transmitting unit 201 to the TV 102 into an amount corresponding to the standby power (step S902). Note that it is possible to omit the processing in step S901 when the operation mode of the TV 102 is automatically changed, for example, when program viewing on the TV 102 automatically ends at the end time of the program for which a viewing reservation has been made, in accordance with the time table. That is, even when the power transmitting apparatus 101 receives no power change request from the TV 102, the power transmitting apparatus 101 may specify a temporal change in power demand in accordance with the time table and decrease the transmitted power to an amount corresponding to the standby power.

Subsequently, the power transmitting apparatus 101 determines whether power has been simultaneously transmitted to the TV 102 and the smartphone 103 (step S903). If the power transmitting apparatus 101 determines that no power has been transmitted to the smartphone 103 and the smartphone 103 is on standby state for the start of charging (NO in step S903), the power transmitting apparatus 101 notifies the smartphone 103 that it should transmit a requested power value (step S904). Upon receiving the requested power value from the smartphone 103, the power transmitting apparatus 101 calculates a power value which can be transmitted to the smartphone 103 based on the maximum transmittable power value of the power transmitting apparatus 101 and the currently transmitted power value, and determines whether power with the requested power value can be transmitted (step S905). Note that the determination in step S905 is performed by determining whether the value obtained by subtracting the power value currently transmitted to another power receiving apparatus from the maximum transmittable power value of the power transmitting apparatus 101 is equal to or more than the requested power value from the smartphone 103. Since this processing is the same as that described concerning step S807 described above, a description of it will be omitted.

Upon determining that the requested power value can be transmitted to the smartphone 103 (YES in step S905), the power transmitting apparatus 101 controls the power transmitting unit 201 to transmit power with the requested power value to the smartphone 103, thereby changing the transmitted power value (step S906). The power transmitting apparatus 101 then starts transmitting power with the changed transmitted power to the smartphone 103 (step S907).

On the other hand, upon determining that power with the requested power value cannot be transmitted to the smartphone 103 (NO in step S905), the power transmitting apparatus 101 notifies the smartphone 103 that power with a transmittable power value is transmitted (step S908). Upon receiving this notification, the smartphone 103 displays, on, for example, the UI unit 710, that a charging time longer than the normal time is required. In addition, the smartphone 103 may calculate an estimated charging complete time from the actually received power value and the current remaining amount of the battery and display the estimated charging complete time. The power transmitting apparatus 101 then controls the power transmitting unit 201 so as to transmit this transmittable power to the smartphone 103, thereby changing the transmitted power value (step S906). The power transmitting apparatus 101 starts transmitting the changed transmitted power to the smartphone 103 (step S907).

If power is being transmitted to the smartphone 103 (YES in step S903), the power transmitting apparatus 101 checks whether it is necessary to change the power to be transmitted to the smartphone 103 (step S909). If, for example, power is being transmitted to the smartphone 103 within the transmittable range upon it is determined in step S807 that power with the power value requested by the smartphone 103 cannot be transmitted, the power transmitting apparatus 101 determines that it is necessary to change the transmitted power. Upon determining that it is necessary to change the transmitted power (YES in step S909), the power transmitting apparatus 101 changes the transmitted power value by controlling the power transmitting unit 201 (step S910), and continues transmitting the changed transmitted power to the smartphone 103. On the other hand, upon determining that it is not necessary to change the transmitted power (NO in step S909), the power transmitting apparatus 101 continues transmitting the power to the smartphone 103 without changing the transmitted power.

In this manner, with the third processing, the power transmitting apparatus 101 can change the transmitted power to the smartphone 103 while transmitting power to the TV 102 in synchronization with power demand in the TV 102 which temporarily varies. This allows the power transmitting apparatus 101 to properly distribute transmitted power to a plurality of power receiving apparatuses.

Note that it is obvious that the TV 102 and the smartphone 103 described above are examples of power receiving apparatuses, and power receiving apparatuses can be mounted on other equipment. In addition, the power transmitting apparatus 101 need not be dedicated to power transmission, and equipment having another application may function as the power transmitting apparatus 101. In addition, the above description has exemplified the case in which only two power receiving apparatuses exist at most. However, each processing described above can be equally applied to a case in which three or more power receiving apparatuses exist. According to the arrangement of this embodiment, the power transmitting apparatus can change the amount of transmitted power in synchronization with a change in power demand in a power receiving apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-121843, filed Jun. 12, 2014, which is hereby incorporated by reference herein in its entirety.

What is claimed is:

1. A power transmitting apparatus comprising:
a power transmitting unit configured to wirelessly transmit power to a power receiving apparatus;
a receiving unit configured to receive schedule information that defines a process performed by the power receiving apparatus and a time at which the process is performed; and
a control unit configured to determine a power amount to be transmitted to the power receiving apparatus in accordance with the process to be performed by the power receiving apparatus and control the power transmitting unit to transmit the determined power amount at a time at which the process is to be performed by the power receiving apparatus, based on the schedule information.

2. The apparatus according to claim 1, wherein the receiving unit receives the schedule information from the power receiving apparatus.

3. The apparatus according to claim 1, wherein the schedule information includes a first time at which the process is to be started and a second time at which the process is to be ended, and
the control unit causes the power transmitting unit to start power transmission at a time corresponding to the first time and to end power transmission at a time corresponding to the second time.

4. The apparatus according to claim 1, further comprising a determination unit configured to determine, based on a transmittable power amount of the power transmitting unit, whether it is possible to transmit power to a second power receiving apparatus, when a power request is received from the second power receiving apparatus while the power transmitting unit transmits power to the power receiving apparatus based on the schedule information, wherein if the determination unit determines that it is possible to transmit power to the second power receiving apparatus, the control unit controls the power transmitting unit to transmit power to the second power receiving apparatus, and if the determination unit determines that it is not possible to transmit power to the second power receiving apparatus, the control unit notifies the second power receiving apparatus that it is not possible to transmit power.

5. The apparatus according to claim 4, further comprising a notification unit configured to notify the second power receiving apparatus of a time when it is possible to transmit power to the second power receiving apparatus, based on the time, at which the process is performed, included in the schedule information, if the determination unit determines that it is not possible to transmit power to the second power receiving apparatus.

6. The apparatus according to claim 4, wherein the determination unit further determines a power amount that can be transmitted to the second power receiving apparatus, and the control unit notifies the second power receiving apparatus of the power amount that can be transmitted to the second power receiving apparatus, and causes the power transmitting unit to transmit the determined power amount to the second power receiving apparatus.

7. The apparatus according to claim 6, wherein if an amount of power to be transmitted by the power transmitting unit to the second power receiving apparatus is smaller than an amount of power requested by the second power receiving apparatus, and power transmission to the power receiving apparatus is complete during power transmission to the second power receiving apparatus by the power transmitting unit, the control unit increases the amount of power to be transmitted to the second power receiving apparatus.

8. The apparatus according to claim 1, wherein the schedule information includes a plurality of pieces of information indicating a date and a time when the power receiving apparatus starts requesting power and a date and a time when the power receiving apparatus ends requesting power.

9. A method of controlling a power transmitting apparatus including a power transmitting unit configured to wirelessly transmit power to a power receiving apparatus, the method comprising:

receiving schedule information that defines a process performed by the power receiving apparatus and a time at which the process is performed;

determining a power amount to be transmitted to the power receiving apparatus in accordance with the process to be performed by the power receiving apparatus; and controlling the power transmitting unit to transmit the determined power amount at the time at which the process is to be performed by the power receiving apparatus, based on the schedule information.

10. The method according to claim 9, wherein the schedule information includes a first time at which the process is to be started and a second time at which the process is to be ended, and the power transmitting unit is caused to start power transmission at a time corresponding to the first time and to end power transmission at a time corresponding to the second time.

11. A non-transitory computer-readable storage medium storing a program to be executed by a processor of a power transmitting apparatus including a power transmitting unit configured to wirelessly transmit power to a power receiving apparatus, the program causes, when executed by the processor, the power transmitting apparatus to:

receive schedule information that defines a process performed by the power receiving apparatus and a time at which the process is performed;

determine a power amount to be transmitted to the power receiving apparatus in accordance with the process to be performed by the power receiving apparatus; and control the power transmitting unit to transmit the determined power amount at a time at which the process is to be performed by the power receiving apparatus, based on the schedule information.

12. The medium according to claim 11, wherein the schedule information includes a first time at which the process is to be started and a second time at which the process is to be ended, and the power transmitting unit is caused to start power transmission at a time corresponding to the first time and to end power transmission at a time corresponding to the second time.

13. A power transmitting apparatus, comprising:

a power transmitting unit configured to wirelessly transmit power to a power receiving apparatus;

an obtaining unit configured to obtain information that is based on a process that the power receiving apparatus executes using power transmitted from the power transmitting apparatus and received by the power receiving apparatus, wherein the information relates to a temporal change in power demand due to a process performed by the power receiving apparatus;

a control unit configured to control the power transmitting unit to change a power amount to be transmitted prior to the change in the power demand and to execute power transmission, based on the information about the temporal change in the power demand.

14. The apparatus according to claim 13, wherein the obtaining unit obtains information indicating a power amount that will be requested at each of one or more time points by the power receiving apparatus for executing the process, as the information relating to the temporal change in the power demand, and the control unit controls the power transmitting unit in accordance with the information indicating power amounts that will be requested.

15. The apparatus according to claim 13, wherein the obtaining unit obtains information indicating an operating mode of the power receiving apparatus at each of one or more time points, as the information relating to the temporal change in the power demand, and the control unit controls the power transmitting unit based on power demand corresponding to the operating mode.

16. The apparatus according to claim 13, wherein the control unit controls the power transmitting unit based on a time point at which the power demand changes.

* * * * *